Patented July 25, 1939

2,167,073

UNITED STATES PATENT OFFICE 2,167,073

ALKYLENE OXIDE-TANNIC ACID REACTION PRODUCT

Karl M. Herstein, Brooklyn, N. Y., assignor, by mesne assignments, to Skol Company, Inc., New York, N. Y., a corporation of New York No Drawing. Application February 12, 1937, Serial No. 125,379

12 Claims. (Cl. 260—47)

This invention relates to a new chemical compound. More particularly, it relates to new tannic acid compounds.

In the art tannic acid is referred to in various ways, such as "gallo tannic acid", "tannin", "digallic acid", etc. For the sake of convenience and brevity, the expression "tannic acid" will be used in this specification to designate the material or compound variously designated as previously mentioned. Tannic acid possesses certain therapeutical properties which make it valuable in certain pharmaceutical preparations. One of the characteristic properties of tannic acid is that it gives a dark blue or green coloration or precipitates with ferric salts. For some purposes this characteristic of tannic acid is undesirable. As a consequence, the use of certain compositions containing tannic acid is restricted.

I have found that I can produce a tannic acid compound or derivative which possesses therapeutical and other properties similar to tannic acid and which will not give the characteristic coloration with ferric salts.

It is therefore an object of this invention to provide a tannic acid compound or derivative which will not give the characteristic coloration or reaction of tannic acid when treated with ferric salts.

Another object of this invention is to provide a method of producing a tannic acid compound or derivative which will not give the characteristic coloration or reaction of tannic acid when treated with ferric salts.

Other objects will appear from the following description and appended claims.

I have found that, when tannic acid is caused to react with an alkylene oxide, there is produced a compound possessing certain therapeutical and light absorption properties similar to tannic acid. Moreover, this compound does not give a coloration when treated with ferric salts similar to that obtained when tannic acid is treated with ferric chloride.

Since the precise chemical constitution or structure is unknown, I do not know the precise chemical constitution of this new compound. Theoretically, the new compound should be a substituted tannic acid, but it is to be understood that this invention is not restricted to said theory.

In accordance with the principles of this invention, an alkylene oxide is introduced into a previously chilled aqueous solution of tannic acid. After the required quantity of alkylene oxide has been introduced, the mixture is permitted to stand at room temperature for a sufficient length of time to permit the reaction to go to completion. If it is desired to accelerate the reaction to completion, a catalyst may be utilized.

After the reaction has gone to completion, there results a solution containing the new tannic acid compound or derivative dissolved therein. The solution also contains some glycol or other substances produced in the reaction as well as the catalyst. If the catalyst is alkaline or acid it can be neutralized in any appropriate manner. The thus resulting solution does not give the undesirable color reaction (blue or green) with ferric salts.

When the product in the solid state is desired, the solution is concentrated by evaporation and the inorganic constituents (resulting from neutralization of the catalyst) are precipitated by the addition of a suitable amount of alcohol. The precipitated inorganic constituents are then removed and the mass is evaporated and dried, producing a brown resinous mass. Prior to the evaporation and drying, or subsequent thereto, the glycol (produced in the reaction) may be removed as, for example, by vacuum distillation.

The final solid product is hygroscopic but difficultly soluble in cold water. It dissolves readily in alcohol and polyhydroxy alcohols, etc. Though difficultly soluble in cold water it will readily dissolve in aqueous solutions containing small proportions of alcohol, acetone, polyhydroxy alcohols, etc. It is insoluble in ether, chloroform and hydrocarbon solvents. It does not give the undesirable blue or green color reaction with ferric salts. Its absorption of ultra violet light, especially in the erythematic range, is substantially at least equal to tannic acid.

As previously explained, alkylene oxide is introduced into a chilled aqueous solution of tannic acid. In the preferred embodiment of the invention, the tannic acid solution is chilled to a temperature between 0° C. and 10° C. In the preferred embodiment, it is chilled to a temperature of 5° C. The chilling can be secured in any well-known manner.

When no catalyst is employed, the reaction takes an appreciable time to go to completion. Thus, when it is desired to accelerate the reaction, a catalyst, either acid or alkaline, may be used. When an alkaline catalyst, such as sodium hydroxide, is employed, the reaction will be completed if carried out at room temperature in approximately 24 hours. When it is desired to still further accelerate the reaction, this may be accomplished by heating the reaction mass slowly to an elevated temperature. For example, when ammonia (specific gravity is 0.9), monoethanolamine or triethanolamine is utilized as the catalyst, the reaction mass may be heated gradually to a temperature of 90° C. and at such temperature the reaction will go to completion in approximately 4 hours.

The proportion of tannic acid and alkylene oxide may vary, depending on the number of hydroxyl groups to be substituted in the tannic acid molecule.

Though any alkylene oxide may be used, I have secured the best results when ethylene or propylene oxide is used.

Though in the preferred embodiment of the invention the tannic acid is dissolved in water, it is to be understood that the reaction may be conducted in other media such as non-aqueous solvents such as acetone or dioxan.

In order to more fully explain the nature of the invention, there are hereafter set forth several illustrative procedures. It is to be understood that these examples are merely illustrative and are not limitative of the invention.

*Example 1.*—To a solution of 5 grams of tannic acid in 20 cc. of water there are added 5 cc. of a 10% sodium hydroxide solution. This mass is then cooled, for example in an ice bath, and when the desired temperature, i. e., 5° C., is obtained, ethylene oxide is bubbled into the solution until the mass has gained 6 grams in weight. The reaction mass is then removed from the ice bath and permitted to stand at room temperature for 24 hours, after which time the reaction is complete.

The thus resulting mass contains the reaction product of ethylene oxide and tannic acid in solution in the water together with whatever amount of glycol has been formed in the reaction as a by-product and also a small quantity of the sodium hydroxide. If desired, the sodium hydroxide may be neutralized with sulphuric acid and the mixture then used directly. On the other hand, if desired, the sodium sulphate may be precipitated by the addition of 2 to 3 volumes of alcohol and removed. Also, if desired, the ethylene glycol formed in the reaction may be removed. Thereafter, the mass is evaporated and dried, producing the solid product.

*Example 2.*—To a solution of 5 grams of tannic acid in 20 cc. of water contained in a suitable vessel there is added 0.2 cc. of any of the following:

Ammonia (specific gravity 0.9)
    Monoethanolamine
    Triethanolamine

The mixture is then chilled to approximately 5° C. and 6 grams of ethylene oxide introduced therein in the manner described in Example 1. After the vessel containing the mixture is firmly sealed, it is heated slowly to 90° C., preferably in a water bath, at which temperature it is maintained for approximately 4 hours. After cooling, the reaction vessel is opened and the solution used or treated as described in Example 1.

Though the invention has been specifically described in connection with tannic acid, it is not restricted thereto. The alkylene oxide may be caused to react with any of the polyhydroxy phenolic compounds, such as polyhydric phenols, for example, gallic acid, digallic acid, pyrogallol and hydroquinone. In the preferred embodiment of the invention, the hydroxy phenolic compounds are of the type which contain the gallic acid radical, such as, for example, gallic acid, digallic acid, gallo-tannic acid, tannic acid, etc.

Since it is obvious that various changes and modifications may be made in the above description without departing from the nature or spirit thereof, this invention is not restricted thereto except as set forth in the appended claims.

I claim:

1. A new chemical compound resulting from the method set forth in claim 7 comprising the reaction product of tannic acid and an alkylene oxide.

2. A new chemical compound resulting from the method set forth in claim 9 comprising the reaction product of tannic acid and ethylene oxide.

3. A method of making a tannic acid compound which comprises introducing a catalyst in an aqueous solution of tannic acid, chilling the solution to a temperature of approximately between 0° C. and 10° C., introducing the desired quantity of ethylene oxide while the solution is maintained at said temperature, permitting the reaction to go to completion, removing the catalyst and other impurities from the reaction mass, and solidifying the resulting tannic acid compound.

4. A new chemical compound resulting from the method set forth in claim 7 comprising the reaction product of tannic acid and an alkylene oxide, said reaction product being a solid insoluble in ether, chloroform, and hydrocarbon solvents and having an absorption capacity for ultra violet light in the erythematic range substantially at least equal to tannic acid.

5. A new chemical compound resulting from the method set forth in claim 9 comprising the reaction product of tannic acid and ethylene oxide, said reaction product being a solid insoluble in ether, chloroform, and hydrocarbon solvents and having an absorption capacity for ultra violet light in the erythematic range substantially at least equal to tannic acid.

6. A method of making a new chemical compound which comprises introducing ethylene oxide into an aqueous solution of tannic acid maintained at a temperature of approximately between 0° C. and 10° C., permitting the reaction to go to completion at room temperature, and removing the impurities from the reaction mass.

7. A method of making a new chemical compound which comprises introducing an alkylene oxide selected from the class which consists of ethylene and propylene oxides into a solution of tannic acid maintained at a temperature of approximately between 0° C. and 10° C., permitting the reaction to go to completion, and removing the impurities from the reaction mass.

8. A method of making a new chemical compound which comprises introducing an alkylene oxide selected from the class which consists of ethylene and propylene oxides into an aqueous solution of tannic acid maintained at a temperature of approximately between 0° C. and 10° C., permitting the reaction to go to completion, and removing the impurities from the reaction mass.

9. A method of making a new chemical compound which comprises introducing ethylene oxide into a solution of tannic acid maintained at a temperature of approximately between 0° C. and 10° C., permitting the reaction to go to completion, and removing the impurities from the reaction mass.

10. A method of making a new chemical compound which comprises introducing ethylene oxide into an aqueous solution of tannic acid maintained at a temperature of approximately between 0° C. and 10° C., permitting the reaction to go to completion, and removing the impurities from the reaction mass.

11. A method of making a chemical compound which comprises adding approximately 5 cc. of 10% sodium hydroxide solution to a solution containing 5 parts by weight of tannic acid dissolved in 20 parts by weight of water, chilling said solution to a temperature of 5° C., introducing 6 parts by weight of ethylene oxide into said solution while the temperature is maintained at 5° C., and permitting the reaction to go to completion at room temperature.

12. A method of making a chemical compound which comprises adding approximately 0.2 cc. of ammonia (sp. gr. 0.9) to a solution containing 5 parts by weight of tannic acid dissolved in 20 parts by weight of water, chilling the resulting mixture to approximately 5° C., introducing 6 parts by weight of ethylene oxide into said solution while the temperature is maintained at 5° C., thereafter increasing the temperature to approximately 90° C., and permitting the reaction to go to completion.

KARL M. HERSTEIN.